United States Patent Office 3,085,109
Patented Apr. 9, 1963

3,085,109
CYCLOUNDEC-1-ENE-1-CARBOXYLIC ACIDS
AND THEIR SALTS AND ESTERS
Pierre Lafont, Lyon, and Yannik Bonnet, Tassin-la-Demi-Lune, France, assignors to Societe des Usines Chimiques Rhone-Poulenc, Paris, France, a French body corporate
No Drawing. Filed July 27, 1961, Ser. No. 127,138
Claims priority, application France Aug. 2, 1960
3 Claims. (Cl. 260—514)

This invention relates to certain new alicyclic carboxylic acids, their salts and esters, to a process for the preparation thereof and to the uses of the said acids, salts and esters.

According to the present invention, there are provided the two isomeric forms of cycloundec-1-ene-1-carboxylic acid (one melting at 138–139° C. and the other at 116–117° C.), their salts and their esters, preferably with aliphatic alcohols containing 1 to 4 carbon atoms.

The aforesaid acids and their salts, in particular the sodium and potassium salts as well as salts with various organic bases, are very powerful choleretics and have been shown to be very active in animal tests, both as to the volume and the quality of the bile secreted. In consequence, they may be used in the treatment of hepato-vascular conditions or hepatic insufficiency.

In addition, certain esters of the cycloundec-1-ene-1-carboxylic acids possess a very agreeable smell and are useful in the preparation of perfumes. Thus, for example, the methyl ester of the acid which melts at 138–139° C. possesses a woody and rose-like note which improves the compositions of perfumes by giving them an increased warmth and fullness and increasing the persistance of the perfume. The ethyl ester of the same acid (B.P. 0.3 mm. Hg/97–98° C.; $n_{25}^D=1.4852$) is characterised by a note of bitter orange with peppery fragrance, and can be used as a fixative for eaux de Cologne.

According to a feature of the present invention, there is provided a process for the preparation of a cycloundec-1-ene-1-carboxylic acid or a salt or ester thereof, which comprises reacting a 2,12-dihalo-cyclododecanone or a 2,2-dihalo-cyclododecanone with an alkali metal compound, such as an alkali metal hydroxide or carbonate, in a solvent medium which is at least partially organic and, if desired, liberating the free acid from the salt formed or converting the product into an ester by any method of ester-formation known per se.

Application of the foregoing process to a 2,12-dihalo compound provides the cycloundec-1-ene-1-carboxylic acid having a melting point of 138–139° C.; a 2,2-dihalo compound gives the isomeric cycloundec-1-ene-1-carboxylic acid having a melting point of 116–117° C.

In carrying out the above process of the invention the alkali metal compound may be dissolved in an aliphatic alcohol, such as methanol or ethanol, or in an aqueous organic medium, for example a water/dioxan mixture. It is preferred to operate with an excess of the alkali metal compound over the stoichiometric proportion and to add progressively the dihalocyclododecanone to the solution of the alkali metal compound. The reaction is preferably effected for several hours at the reflux temperature. The free acids may be liberated directly by acidification of the alkali metal salts formed.

By utilizing an alternative procedure, it is possible to obtain the acid having a melting point of 116–117° C. from a 2,12-dihalocyclododecanone. In this procedure the 2,12-dihalo compound is treated with a suspension of an alkali metal alcoholate in a non-polar organic liquid, the resulting reaction mass is treated, after removal of the non-polar liquid, with a solution of an alkali metal compound, such as a hydroxide, in an aqueous organic medium, and the acid is liberated by acidifying the mixture. Both the said treatments are preferably effected at the reflux temperature. Examples of suitable non-polar organic liquids are aliphatic hydrocarbons such as heptane, alicyclic hydrocarbons such as cyclohexane and aromatic hydrocarbons such as benzene and toluene. Examples of suitable alkali metal alcoholates are anhydrous sodium methoxide and ethoxide. The said aqueous organic medium is preferably an aqueous alcoholic medium such as aqueous methanol or ethanol.

Esterification of the cycloundec-1-ene-1-carboxylic acids can be effected by known methods, such as by heating with aliphatic, alicyclic and aromatic alcohols. Certain esters, and in particular methyl and ethyl cycloundecenecarboxylates, can be obtained directly from the dihalo-cyclododecanones by boiling the latter with an anhydrous alkali metal alcoholate, such as sodium methoxide or ethoxide.

The 2,12-dihalo-cyclododecanones used as starting materials in the process of the invention are prepared by progressively introducing into cyclododecanone in an inert organic solvent medium at most 2 moles of halogen per mole of the ketone and separating the 2,12-dihalo product from the reaction mixture. The quantity of halogen used should not exceed the theoretical quantity and is preferably near to this value, for example 1.5 to 2.0 moles per mole of the ketone. Examples of suitable solvents are chloroform and carbon tetrachloride. This process actually produces a mixture of halogenated products but the 2,12-dihalo-cyclododecanone, e.g. the 2,12-dichloro compound of melting point 119° C. or the 2,12-dibromo compound of melting point 123° C., is obtained in the preponderant proportion.

The 2,2-dihalo-cyclododecanones, which are the other starting materials of the aforesaid process, are prepared by subjecting sodium 1-halo-2-oxo-cyclododecane-carboxylate to simultaneous halogenation and decarboxylation and separating the 2,2-dihalo product from the reaction mixture. The reaction is preferably carried out by introducing the halogen into an aqueous solution of the carboxylate at 60° to 80° C. for at least one hour. The reaction mass is then extracted with an organic solvent, for example diethyl ether, and the residue obtained after evaporation of the diethyl ether is then recrystallized.

The carboxylate starting material in the above process may be obtained by treating the sodio-derivative of cyclododecanone with solid carbon dioxide, separating the keto-acid formed, halogenating this keto-acid in a solvent inert to halogen, such as benzene, diethyl ether, chloroform or carbon tetrachloride, at about 20° C. by introducing the theoretical quantity of halogen and converting the 1-halo-2-oxo-cyclododecanecarboxylic acid thus obtained into its sodium salt.

The following examples will serve to illustrate the invention.

*Example I*

A solution of potassium hydroxide (200 g.) in water (1000 cc.) and dioxan (500 cc.) is heated to boiling in a three litre flask fitted with a central stirrer, a cooler and a drip-feed and a solution of 2,12-dibromocyclododecanone (249 g.) in dioxan (500 cc.) is added over one hour. After refluxing with stirring for 10 hours, the dioxan is removed by distillation and water (500 cc.) and diethyl ether (500 cc.) are added and the mixture stirred. The aqueous layer is separated and acidified to pH 5 by the addition of 10% hydrochloric acid. A crystalline product (11 g.) precipitates consisting of cycloundec-1-ene-1-carboxylic acid (representing a 77.5% yield based upon the dibromoketone), M.P. 138–139° C. after recrystallization from a 50:50 (by volume) mixture of diethyl ether and petroleum ether (35–50° C. fraction).

2,12-dibromocyclododecanone, used as starting material, is prepared as follows:

Cyclododecanone (182 g.; 1 mole) and chloroform (800 cc.) are placed in a two litre flask fitted as above and bromine (320 g.; 2 moles) is added dropwise with stirring at 20–25° C. over two and a half hours. Stirring is continued for one hour and after stirring has ceased the chloroform is evaporated on the water-bath, giving a white product (300 g.) in the form of fine needles which, on recrystallization from ethanol, yields 2,12-dibromocyclododecanone (280 g.; representing an 82.5% yield based on the ketone used, M.P. 123° C.

*Example II*

A solution of 2,12-dibromocyclododecanone (17 g.) in dioxan (50 cc.) is introduced over 15 minutes into a 1 litre 3-necked flask containing a boiling solution of sodium carbonate (34 g.) in a mixture of water (200 cc.) and dioxan (200 cc.). After refluxing for 32 hours and treating as in Example I, crude cycloundec-1-ene-1-carboxylic acid (8.5 g. representing an 86% yield based on the dibromocyclododecanone) is obtained, M.P. 138.5° C. after recrystallization from a 50:50 (by volume) mixture of diethyl ether and petroleum ether (35–50° C. fraction).

Example III

A solution of 2,12-dichlorocyclododecanone (12.55 g.) in dioxan (30 cc.) is introduced with stirring over 30 minutes into a 250 cc. 3-necked flask containing a boiling solution of potassium hydroxide (12 g.) in a mixture of dioxan (75 cc.) and water (75 cc.). After refluxing for 6 hours and operating as in Example I, crude cycloundec-1-ene-1-carboxylic acid (8 g. representing an 82% yield based on the dichloroketone) is obtained, M.P. 138–139° C. after recrystallization from petroleum ether.

The 2,12-dichlorocyclododecanone used as starting material is prepared in the following manner:

Cyclododecanone (182 g.; 1 mole) and carbon tetrachloride (500 cc.) are placed in a 1 litre flask fitted as in Example I, and chlorine (106 g.; about 1.5 moles) is bubbled in over 2 hours with stirring at 20–25° C. After stirring for a further hour, the reaction product is washed with water (2 x 300 cc.) until neutral. After drying over anhydrous sodium sulphate and evaporating the solvent, a residue crystallises containing a mixture of monochloro- and dichlorocyclododecanone from which the dichlorocyclododecanone is separated by recrystallization from methanol. 2,12-dichlorocyclododecanone (100 g.), M.P. 119° C. is thus obtained.

*Example IV*

A solution of 2,2-dibromocyclododecanone (2 g.) in methanol (10 cc.) is added over 5 minutes to a boiling solution of potassium hydroxide (1.2 g.) in methanol (10 cc.) in a 100 cc. 3-necked flask. After refluxing for about one hour, the methanol is distilled off, replaced by water and the reaction mass extracted with diethyl ether. A neutral fraction (1.2 g.) is recovered from this ethereal extract consisting of cyclododecane-1,2-dione, a compound already described by Prelog and Speck (Helv. Chim. Acta, vol. 38, p. 1781 (1955)). Acidification of the aqueous fraction gives cycloundec-1-ene-1-carboxylic acid (0.6 g.), M.P. 117° C. after recrystallization from a 50:50 (by volume) mixture of diethyl ether and petroleum ether (35–50° C. fraction). The mixed melting point of this acid (M.P. 117° C.) and its isomer obtained according to Examples I–III (M.P. 138–139° C.) shows a large depression.

The 2,2-dibromocyclododecanone starting material is prepared in the following manner:

1-bromo-2-oxo-cyclododecanecarboxylic acid (10.5 g.) is dissolved in chloroform (300 cc.) and the acid neutralized by the addition of a saturated solution of sodium bicarbonate (with 5% excess). After stirring for several minutes, the insoluble sodium salt which forms is separated and dried. This salt (9.5 g.) and water (1 litre) are placed in a 2 litre 3-necked flask, and bromine (3.8 g.) added with stirring and the mixture heated gradually to 60° C. Decoloration commences accompanied by an evolution of carbon dioxide. Heating is continued at 60–80° C. with stirring for 2 hours. After cooling and extracting with diethyl ether, the ethereal extracts are washed with water, dried and the solvent evaporated. The residue (7 g.) crystallizes immediately. After recrystallization from a diethyl ether-petroleum ether mixture, 2,2-dibromocyclododecanone (3.5 g.), M.P. 73° C. is obtained, bromine content 47.27% (theoretical = 47.01%) and gives on hydrolysis in aqueous alcoholic medium and treatment with 2,4-dinitrophenylhydrazine hydrochloride, a product identical with the cyclododecane-1,2-dione bis(2,4-dinitrophenylhydrazone) described by Prelog and Speck (loc. cit.).

1-bromo-2-oxo-cyclododecanecarboxylic acid is obtained by the action of solid carbon dioxide on the sodio-derivative of cyclododecanone and separation of the keto-acid formed followed by bromination at room temperature with the theoretical quantity of bromine, in chloroform.

*Example V*

Dry sodium methoxide (24 g.) is suspended in benzene (250 cc.) and boiled with stirring. 2,12-dibromocyclododecanone (64 g.) is added gradually over 30 minutes and the mixture refluxed for 16 hours. Benzene is then removed by distillation in vacuo and the solid residual mass is treated with potassium hydroxide (16 g.) in methanol (150 cc.) and water (100 cc.). After refluxing for 6 hours, the methanol is removed by distillation and water (100 cc.) added. After extraction into diethyl ether of a small neutral fraction (about 1 g.), the aqueous fraction is acidified and itself extracted with diethyl ether. After drying and evaporation of the solvent, a mass of acid product (32 g.) is obtained which, recrystallized from diethyl ether, gives cycloundec-1-ene-1-carboxylic acid (25 g.), M.P. 117° C.

*Example VI*

2,12-dibromocyclododecanone (51 g.) is introduced gradually over 1½ hours into a 500 cc. 3-necked flask containing a solution of sodium (7 g.) in anhydrous ethanol (200 cc.). After refluxing for 16 hours, the ethanol is evaporated and the residue neutralized by the addition of dilute hydrochloric acid. Water (100 cc.) is added and the mass is extracted with diethyl ether. After drying the ethereal extract and evaporating the solvent, crude ethyl cycloundecenecarboxylate (33.3 g., representing a 99.2% yield) is obtained which yields on distillation the pure ester (29.9 g.), B.P. 0.3 mm. Hg/97–98° C., $n_{25}^D = 1.4852$.

Medicinal compositions may be prepared containing the cycloundec-1-ene-1-carboxylic acids, or their salts, in the pure state or mixed with any suitable physically, chemically a physiologically compatible, pharmacologically inert or active substances. These compositions may be solids or liquids and may contain inert substances such as diluents, lubricants, perfumes and sweetening agents. The compositions may be presented in any suitable pharmaceutical form, in particular those suitable for oral, rectal or parenteral administration.

According to a further feature of the invention therefore, there are provided pharmaceutical compositions comprising a cycloundec-1-ene-1-carboxylic acid or a salt thereof in association with a pharmaceutically acceptable carrier.

The daily dosage to be used depends, among other factors, on the therapeutic effect sought, the route of administration, the length of the treatment and the age of the patient. The chosen product may be administered orally or rectally at a rate of 300 to 1500 mg. per day of cycloundec-1-ene-1-carboxylic acid. In injectable form, doses to be administered may vary from 100 to 500 mg. per day.

The following examples illustrate pharmaceutical compositions containing the compounds of the invention.

*Example VII*

Ampoules containing cycloundec-1-ene-1-carboxylic acid, M.P. 138–139° C. (0.150 g.) in the form of the sodium salt are prepared by freeze-drying the following solution, which has been filtered through a Seitz sterilizing filter and aseptically introduced into 15 cc. ampoules containing 5 cc. of the solution per ampoule:

| | |
|---|---|
| Cycloundec-1-ene-1-carboxylic acid g | 3 |
| 1.0 N aqueous sodium hydroxide solution cc | 15.3 |
| Freshly distilled water, q.s.p cc | 100 |

When the solution is required for injection, pyrogen-free distilled water (10 cc.) is added to the contents of the ampoule giving an injectable solution which is ready for use.

Injectable solutions with similar characteristics can be prepared by substituting for the acid M.P. 138–139° C. its isomer M.P. 116–117° C. or again by using a mixture of these two acids.

*Example VIII*

Tablets (0.5 g.) are prepared by mixing, granulating and compressing, in the usual fashion, mixtures of the following composition:

| | G. |
|---|---|
| Cycloundec-1-ene-1-carboxylic acid (either isomer or a mixture of both) | 0.250 |
| Starch | 0.190 |
| Silica gel | 0.050 |
| Magnesium stearate | 0.010 |

We claim:

1. A compound selected from the class consisting of the isomeric cycloundec-1-ene-1-carboxylic acids, the alkali metal salts thereof and the esters thereof formed with alkanols containing 1–4 carbon atoms.

2. The cycloundec-1-ene-1-carboxylic acid which has a melting point of 138° to 139° C.

3. The cycloundec-1-ene-1-carboxylic acid which has a melting point of 116° to 117° C.

No references cited.